(12) United States Patent
Johnson et al.

(10) Patent No.: US 8,782,055 B2
(45) Date of Patent: Jul. 15, 2014

(54) GEOSPATIAL OBJECT PROPERTY ASSESSMENT APPARATUS, ASSESSMENT SYSTEM, EDITOR APPARATUS AND METHOD OF ASSESSING PROPERTY OF A GEOSPATIAL OBJECT

(75) Inventors: Terry William Johnson, Grantham, NH (US); Peter Aloysius Moeykens, Claremont, NH (US); Patricia Jane Lawler, Bradford, VT (US)

(73) Assignee: TomTom North America, Inc., Lebanon, NH (US)

( * ) Notice: Subject to any disclaimer, the term of this patent is extended or adjusted under 35 U.S.C. 154(b) by 190 days.

(21) Appl. No.: 13/318,627

(22) PCT Filed: Apr. 23, 2010

(86) PCT No.: PCT/US2010/032152
§ 371 (c)(1),
(2), (4) Date: Mar. 5, 2012

(87) PCT Pub. No.: WO2010/129194
PCT Pub. Date: Nov. 11, 2010

(65) Prior Publication Data
US 2012/0158746 A1 Jun. 21, 2012

Related U.S. Application Data

(60) Provisional application No. 61/215,238, filed on May 4, 2009.

(51) Int. Cl.
*G06F 17/30* (2006.01)
(52) U.S. Cl.
USPC ........... 707/748; 707/743; 707/754; 707/756; 701/531; 701/481; 701/468; 701/409

(58) Field of Classification Search
CPC ................................. G06F 17/00; G06F 17/30
See application file for complete search history.

(56) References Cited

U.S. PATENT DOCUMENTS

| 7,917,458 B2 * | 3/2011 | Dalton | 706/46 |
| 7,933,897 B2 * | 4/2011 | Jones et al. | 707/723 |
| 8,037,078 B2 * | 10/2011 | Frank | 707/748 |

(Continued)

OTHER PUBLICATIONS

Meeks, W. Lee, et al., "Geospatial informaiton utility: an estimation of the relevance of geospatial information to users," Jul. 25, 2003, Science Direct, Decision Support Systems, vol. 48, pp. 47-63 (17 total pages).*

(Continued)

*Primary Examiner* — Farhan Syed

(57) ABSTRACT

A geospatial object property assessment apparatus comprises a processing resource (102) arranged to support a geospatial object property processor (206) comprising a subject data source input (212) capable of receiving a first metadata associated with 10 quality of current source information content used to define a property (408) of a geospatial object; a resource data source input (214) capable of receiving a second metadata associated with quality of candidate resource information content for updating the definition of the property (408) of the geospatial object. The apparatus also comprises an assessment processor (208) operably coupled to the inputs (212, 214), the 15 assessment processor (208) being arranged to use the first metadata and the second metadata in accordance with a predetermined ruleset in order to determine whether the candidate resource information content constitutes a qualitatively better resource to define the property of the geospatial object than the current source information content.

21 Claims, 9 Drawing Sheets

(56) References Cited

U.S. PATENT DOCUMENTS

| | | | |
|---|---|---|---|
| 8,194,922 B2* | 6/2012 | Jamison et al. | 382/103 |
| 8,468,244 B2* | 6/2013 | Redlich et al. | 709/225 |
| 2004/0236730 A1* | 11/2004 | Frank | 707/3 |
| 2006/0041375 A1* | 2/2006 | Witmer et al. | 701/208 |
| 2007/0143345 A1* | 6/2007 | Jones et al. | 707/104.1 |
| 2008/0154829 A1 | 6/2008 | Dalton | |
| 2009/0019081 A1 | 1/2009 | Safra et al. | |
| 2009/0074254 A1 | 3/2009 | Jamison et al. | |
| 2009/0144144 A1* | 6/2009 | Grouf et al. | 705/14 |
| 2009/0144168 A1* | 6/2009 | Grouf et al. | 705/26 |
| 2009/0144801 A1* | 6/2009 | Grouf et al. | 726/1 |
| 2009/0150405 A1* | 6/2009 | Grouf et al. | 707/10 |
| 2009/0254572 A1* | 10/2009 | Redlich et al. | 707/10 |
| 2010/0250497 A1* | 9/2010 | Redlich et al. | 707/661 |
| 2011/0258049 A1* | 10/2011 | Ramer et al. | 705/14.66 |
| 2012/0209705 A1* | 8/2012 | Ramer et al. | 705/14.51 |
| 2012/0209706 A1* | 8/2012 | Ramer et al. | 705/14.51 |
| 2012/0209707 A1* | 8/2012 | Ramer et al. | 705/14.51 |
| 2012/0209708 A1* | 8/2012 | Ramer et al. | 705/14.51 |
| 2012/0209709 A1* | 8/2012 | Ramer et al. | 705/14.51 |
| 2012/0209710 A1* | 8/2012 | Ramer et al. | 705/14.51 |
| 2012/0215602 A1* | 8/2012 | Ramer et al. | 705/14.13 |
| 2012/0215612 A1* | 8/2012 | Ramer et al. | 705/14.23 |
| 2012/0215622 A1* | 8/2012 | Ramer et al. | 705/14.44 |
| 2012/0215623 A1* | 8/2012 | Ramer et al. | 705/14.44 |
| 2012/0215624 A1* | 8/2012 | Ramer et al. | 705/14.44 |
| 2012/0215625 A1* | 8/2012 | Ramer et al. | 705/14.44 |
| 2012/0215626 A1* | 8/2012 | Ramer et al. | 705/14.44 |
| 2012/0215635 A1* | 8/2012 | Ramer et al. | 705/14.51 |
| 2012/0215639 A1* | 8/2012 | Ramer et al. | 705/14.53 |
| 2012/0215640 A1* | 8/2012 | Ramer et al. | 705/14.55 |

OTHER PUBLICATIONS

Malczewski, Jacek, "GIS-based land-use suitability analysis: a critical overview," Sep. 2003, Science Direct, Progress in Planning, vol. 62, pp. 3-65 (63 total pages).*

International Search Report issued Jul. 2, 2010 for International Application No. PCT/US2010/032152.

* cited by examiner

GEOSPATIAL OBJECT PROPERTY ASSESSMENT APPARATUS, ASSESSMENT SYSTEM, EDITOR APPARATUS AND METHOD OF ASSESSING PROPERTY OF A GEOSPATIAL OBJECT

CROSS-REFERENCES TO RELATED APPLICATIONS

This application is the National Stage of International Application No. PCT/US2010/032152, filed Apr. 23, 2010 and designating the United States. The application claims the benefit of U.S. Provisional Application No. 61/215,238 filed May 4, 2009. The entire contents of both these applications are incorporated herein by reference.

FIELD OF THE INVENTION

The present invention relates to a geospatial object property assessment apparatus of the type that, for example, retrieves current source information content associated with a property of a geospatial object and assesses quality of the current source information content. The present invention also relates to a geospatial object property assessment system of the type that, for example, retrieves current source information content associated with a property of a geospatial object and assesses quality of the current source information content. The present invention further relates to an editor apparatus of the type that, for example, retrieves current source information content associated with a property of a geospatial object and assesses quality of the current source information content. The present invention also relates to a method of assessing a property of a geospatial object, the method being of the type that, for example, retrieves current source information content associated with a property of a geospatial object and assesses quality of the used information content.

BACKGROUND TO THE INVENTION

In the field of Geographic Information Systems (GISs), it is known to capture, analyse, manage, and present data associated with locations. In this regard, GISs are known to enrich cartographic information using database technology in order to generate information-rich cartographic data.

In relation to a digital map, it is known for producers of digital maps to generate map products based upon a master resource of geospatial data. In this respect, it is known to use a master digital map database containing a great deal of data concerning geospatial layers. Geospatial layers are a collection of similar objects that are defined by geometry and attribution, for example a street layer. The geometry is usually represented by a series of coordinates that define points along the outline of the object. Objects are generally defined by polygons, lines or points. An example of a polygonal object would be the outline of a political boundary such as a county. An example of a line object would be a street segment. A single point object could represent a city center or a point of interest. Attributes are fields in a geospatial dataset that define information associated with geospatial objects. In the context of a street layer, for example, attributes that could be associated with a street segment in the street layer of the geospatial dataset could be: street names, prefixes (such as North or South), suffixes (such as Blvd or Street) and/or speed limits to name but a few. If the street segment represents a city block, an additional attribute can be an address range.

Additional attribution that defines the source of information used to create either geometry or attribution and the quality of information and/or the age of the information are referred to as metadata. An example of metadata for a street layer would be positional accuracy in terms of accuracy in meters.

Clearly, in order to be able to provide digital maps of the highest quality, it is necessary to keep the underlying information used to create the digital maps up-to-date. In order to achieve this aim, data is collected in a number of ways, for example aerial photography, video logging using mobile mapping vans and conflation—the merging of localized geospatial datasets. The information generated by these acquisitions techniques is stored electronically and the stored information is known as a "resource". Indeed, the initial data stored in the master digital map database is typically derived from such resources. Clearly, as time progresses, the geospatial dataset becomes out-of-date and inaccurate, for example as new roads are built and underlying attribution changes. It is therefore necessary to update a geospatial database used to generate a digital map periodically from new resources.

New resources may only be useful to update specific attribution or geometry. For example, an aerial photograph may depict road geometry accurately, but may be of little utility value as a source of information for speed limit signs, because the signs deployed along a road network cannot be seen from the air. In contrast, video logs generated using mobile mapping vans can capture speed limit information very well. Furthermore, within a resource the quality of the information content can vary. For example, an aerial photograph of a desert can show road geometry very clearly, whereas an aerial photograph of a forest may not show any or only some roads due to visibility of the roads from the air being obscured by trees.

Additionally, quality of the information content contained by a resource can change with time. For example, a resource that was 100% complete and accurate at a first point in time for street names in a given geographic area can diminish in completeness and accuracy over time and at a second, later, point in time, can be less accurate and complete due to construction of new streets, street renaming and other real-world changes. Consequently, a resource that is 100% complete and accurate at the time recorded, may be much less complete and accurate ten years later and no longer an optimum choice for use as a resource as compared with another resource that is only 92% complete and accurate, but more recently recorded.

In order to edit a geospatial dataset, so-called map editor applications are employed. A map editor application uses resources of the type mentioned above in order to update information content relating to geometry and/or attribution stored as part of the geospatial dataset. When an aerial photograph becomes available showing new roads that are not yet recorded in the geospatial dataset, the geometry of the roads in question are added to the geospatial dataset using the map editor application.

In addition to editing, automated processes are also used to update the geospatial dataset. An example of this is the process known as conflation mentioned above, where a particular dataset for a specific geographic area is merged into the master dataset in an automated fashion. For example, a geospatial dataset maintained by a county government and containing a street layer can be merged into a state database, because the geospatial dataset maintained by the county government is of superior quality to a state database for the state of which the county is part. Automated conflation algorithms attempt to merge the one or more superior quality aspects of the county database with the existing information of the master state database.

A number of difficulties exist when editing the information content associated with attribution or geometry of a geospatial dataset of the master digital map database.

One particular problem relates to choice of resource to use. In this respect, more than one resource may be available from which content information for a given attribute of the geospatial dataset can be obtained. However, information content obtained from one resource in respect of one attribute or a geometry of the geospatial dataset may not be an optimum resource for the information content of a different type of attribute or geometry of the geospatial dataset. Also, information content obtained from one resource in respect of an instance of an attribute or geometry of the geospatial dataset does not mean that the same resource is an optimum resource for another instance of the same type of attribute or geometry of the geospatial dataset. Similarly, as suggested above, a resource may be an optimum resource from which to obtain information content for an attribute or geometry at one point in time, but may not be the optimum resource from which to obtain the information content at a later point in time. Consequently, a most recently dated resource of a given type may not necessarily be the optimum resource from which to obtain the information content. For example, a resource of earlier date, but of superior quality, may be the optimum resource to use in preference over a more recent resource. Likewise, if the more recent resource comprises information content relating to the attribute, but was collected using a lower quality method than an older resource, the older resource may still be the optimum resource to use.

In order to record quality of a resource used in order to edit or initially record an attribute or geometry of a geographic feature, some current implementations of geospatial datasets simply comprise flags or indicators of the quality of an attribute or geometry. However, this technique, an example of the "additional attribution" mentioned above, can lead to a number of disadvantages. Firstly, simple recordal of flags or indicators of quality in respect of attributes or geometries in the geospatial dataset of the master digital map database does not enable comparison of different resources to take place and use of a resource less accurate than one already used would result in degradation in the quality of the current geospatial dataset. Secondly, when a new resource becomes available and is applicable in respect of a number of attributes or geometries, an editor application or a conflation application is unable to identify all attributes or geometry having information content obtained from an existing resource that needs to be replaced. Similarly, it is not possible to determine when it is necessary to override a currently used resource with a different resource.

Many geospatial datasets also contain metadata (data about data) which generally describe the overall currency, precision and accuracy of source material of a geospatial dataset, but rarely do these geospatial datasets comprise information to the level of individual geometric objects or individual attributes associated with those objects. In addition, there is no clearly defined ranking of the quality of the source relative to the other different types of sources. Therefore no clear approach can be taken as to when aspects of the geospatial dataset need to be updated.

Also, as suggested above, the confidence in a resource as a source of the information content degrades with time as does confidence in the actual information content used to characterise an attribute in the current geospatial dataset. For example, a road network shown in a video log captured by a mobile mapping van is perfectly accurate on the day of capture, but becomes less accurate over time as construction or other real-world changes occur. Furthermore, different resources degrade at different rates. For example, a resource recording a road network in a city is likely to remain relatively stable over time compared to another resource recording a road network in a growing suburb. Additionally, for a given resource, the information content for different attributes can degrade at different rates. For example, a road network in a city can remain relatively stable over time, but navigation attributes, such as one-way designations, can change relatively frequently.

In relation to resource selection, it is known to select manually an optimum resource from among a number of candidates, and sometimes conflicting, resources for editing a current geospatial dataset based upon a single criterion, for example date of capture. However, such an approach neither takes account of the inherent quality of a resource for a particular attribute to be edited nor a variance of quality of an attribute within the resource. Alternatively, simple rules are known to be assigned for the use of certain types of resource, for example aerial photographs are not used for extraction of sign text, because signs are not visible from the air. However, application of such simple rules does not take into account the currency of the resource.

When updating an attribute, where multiple factors are to be taken into account when assessing resources, it is known to apply heuristics. For example, a "least recently maintained" algorithm can be used to identify attributes of a geospatial dataset in need of updating. However, heuristics typically only take simple conditions into account and so are naïve and/or are slow to implement in a map editing environment. Consequently, the use of heuristics can lead to relevant factors being ignored and/or are not cost effective to implement. Furthermore, the application of heuristics by manual methods is subject to human error.

SUMMARY OF THE INVENTION

According to a first aspect of the present invention, there is provided a geospatial object property assessment apparatus, the apparatus comprising: a processing resource arranged to support a geospatial object property processor, the geospatial object property processor including: a subject data source input capable of receiving a first metadata associated with quality of current source information content used to define a property of a geospatial object; a resource data source input capable of receiving a second metadata associated with quality of candidate resource information content for updating the definition of the property of the geospatial object; and an assessment processor operably coupled to the subject data source input and the resource data source input, the assessment processor being arranged to use the first metadata and the second metadata in accordance with a predetermined ruleset in order to determine whether the candidate resource information content constitutes a qualitatively better resource to define the property of the geospatial object than the current source information content.

The first metadata may comprise an indicator of quality of the current source information content associated with the property of a geospatial object and a first resource identifier for identifying a source dataset comprising the current source information content currently employed; and the second metadata may comprise an indicator of quality of the candidate resource information content associated with the property of the geospatial object and a second resource identifier for identifying a resource dataset comprising the candidate resource information content to be assessed.

The property of the geospatial object may be an attribute of the geospatial object. The property of the geospatial object is a geometry of the geospatial object.

The geospatial object property processor may further comprise: a data retrieval controller operably coupled to the subject data source input and the resource data source input; the data retrieval controller may be arranged to request retrieval via the subject data source input of the first metadata and retrieval via the resource data source input of the second metadata; wherein the data retrieval controller may be arranged to request the retrieval in response to identification of the property of the geospatial object by received property identifying data.

The geospatial object property processor may further comprise: a property identity input arranged to receive the property identifying data to identify the property of the geospatial object to be assessed.

Generation of the property identifying data may be user-instigated.

The first metadata may comprise a first confidence value. The first confidence value may have a first confidence class associated therewith. The first metadata comprises a first adjustment value.

The second metadata may comprise a second confidence code value. The second confidence value may have a second confidence class associated therewith. The second metadata may comprise a second adjustment value.

The assessment processor may be arranged to calculate a first score using the first metadata. The assessment processor may be arranged to calculate a second score using the second metadata. The assessment processor may be arranged to use the first score and the second score in accordance with the predetermined ruleset in order to determine whether the candidate resource information content constitutes the qualitatively better resource to define the property of the geospatial object than the current source information content. The first score and second scores may be assessed using a tolerance factor applied in accordance with the predetermined ruleset.

The assessment processor may be arranged to include use of a first degradation factor to calculate the first score. The degradation factor may be time.

The assessment processor may be arranged to include use of a second degradation factor to calculate the second score. The degradation factor may be time.

The rule set may comprise the following equation for performance of an evaluation: $s=((v_c+v_d)*m)-f_d$, where: $s$ may be the score; $v_c$ may be a confidence value; $v_d$ may be a deviation value; and $f_d$ may be a degradation factor; and m may be multiplier in months used to support degradation by a percentage point for m months.

The assessment processor may be capable of receiving a further metadata associated with another candidate resource information content; the assessment processor may be arranged to employ a different criterion to assess the further metadata than a criterion employed by the predetermined ruleset to assess the second metadata.

The data retrieval controller may be arranged to identify third metadata associated with quality of another current source information content used to define another property of the geospatial object in response to the determination that the qualitatively better resource is available to define the property of the geospatial object than the current source information content. Another candidate resource information content may have a fourth metadata associated with quality of another candidate resource information content for updating the definition of the another property of the geospatial object; the assessment processor may be arranged to use the third metadata and the fourth metadata in order to determine whether the another candidate resource information content constitutes a qualitatively better resource to define the another property of the geospatial object than the another current source information content.

The apparatus may further comprise: a data editor arranged to update the property of the geospatial object by replacing the current source information content used to define the property of the geospatial object with the candidate resource information content.

The apparatus may further comprise: a data editor arranged to record an association between the property of the geospatial object and the second metadata instead of the first metadata.

The current source information content associated with the geospatial object may be updated in response to evaluation of an expression using the first and second scores in accordance with the predetermined ruleset.

The geospatial object property processor may be arranged to update the current source information content in response to a plurality of determinations by the assessment processor that a resource dataset comprising the candidate resource information constitutes a qualitatively better dataset resource to define respectively a plurality of geospatial object properties than a source dataset comprising the current source information content.

The apparatus may further comprise: a third metadata associated with quality of another candidate resource information content for updating the definition of the property of the geospatial object; wherein the assessment processor may be arranged to use the first metadata and the third metadata in accordance with the predetermined ruleset in order to determine whether the another candidate resource information content constitutes a qualitatively better resource to define the property of the geospatial object than the current source information content; the assessment processor may be arranged to select one of the candidate information content and the another candidate information content in response to respective evaluations of the predetermined ruleset; the selected one of the candidate information content and the another candidate information content may have a superior evaluation result and may be used to update the current source information content.

According to a second aspect of the present invention, there is provided an editor apparatus comprising the geospatial object property assessment apparatus as set forth above in relation to the first aspect of the invention.

The apparatus may further comprise an alert generator; the alert generator may be arranged to generate an alert in response to the determination by the assessment processor that the candidate resource information constitutes the qualitatively better resource to use to define the property of the geospatial object than the current source information content.

According to a third aspect of the present invention, there is provided a geospatial object property assessment system comprising: the geospatial object property assessment apparatus as set forth above in relation to the first aspect of the invention; a database of currently used geospatial data to be analysed, the database of geospatial data comprising the current source information content associated with the definition of the property of the geospatial object; and a database of candidate geospatial data comprising the candidate resource information content associated with the geospatial object; wherein the first metadata is associated with the database of currently used geospatial data and the second metadata is associated with the database of candidate geospatial data.

The data retrieval controller may be arranged to access the current source information content from the database of used geospatial data. The data retrieval controller may be arranged to access the candidate resource information content from the database of candidate geospatial data.

According to a fourth aspect of the present invention, there is provided a method of assessing a property of a geospatial object, the method comprising: receiving a first metadata associated with quality of current source information content used to define a property of a geospatial object; receiving a second metadata associated with quality of candidate resource information content for updating the definition of the property of the geospatial object; and assessing the first metadata and the second metadata in accordance with a predetermined ruleset in order to determine whether the candidate resource information content constitutes a qualitatively better resource to define the property of the geospatial object than the current source information content.

According to a fifth aspect of the present invention, there is provided a computer program element comprising computer program code means to make a computer execute the method as set forth above in relation to the fourth aspect of the invention.

The computer program element may be embodied on a computer readable medium.

Advantages of these embodiments are set out hereafter, and further details and features of each of these embodiments are defined in the accompanying dependent claims and elsewhere in the following detailed description.

It is thus possible to provide an attribute update apparatus, an attribute update system, an editor apparatus and a method of updating information content that permits suitable and optimum resources to be selected for obtaining information content in respect of an attribute or geometry in a, reliable, consistent and objective manner. Consequently, the use of automated weighting of multiple factors obviates or at least mitigates the need for the involvement of error-prone human subjectivity in a decision as to the optimum resource to use. Furthermore, the apparatuses, system and method are thus compatible with automated identification of the most suitable resource to source attributes or geometry from the selection of available resources. It is also possible to identify attributes that require maintenance in an automated manner. Furthermore, degradation of a geospatial dataset currently being used is prevented as use of lower-quality resources than currently employed in respect of an attribute is avoided. Also, by recording an association between a currently used source of geospatial data and a property of a geospatial object, the quality data associated with the geospatial object can be downgraded or upgraded automatically in the event that the source of geospatial data is found at a point in time (after initial use) to be of better or lesser quality than initially believed.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
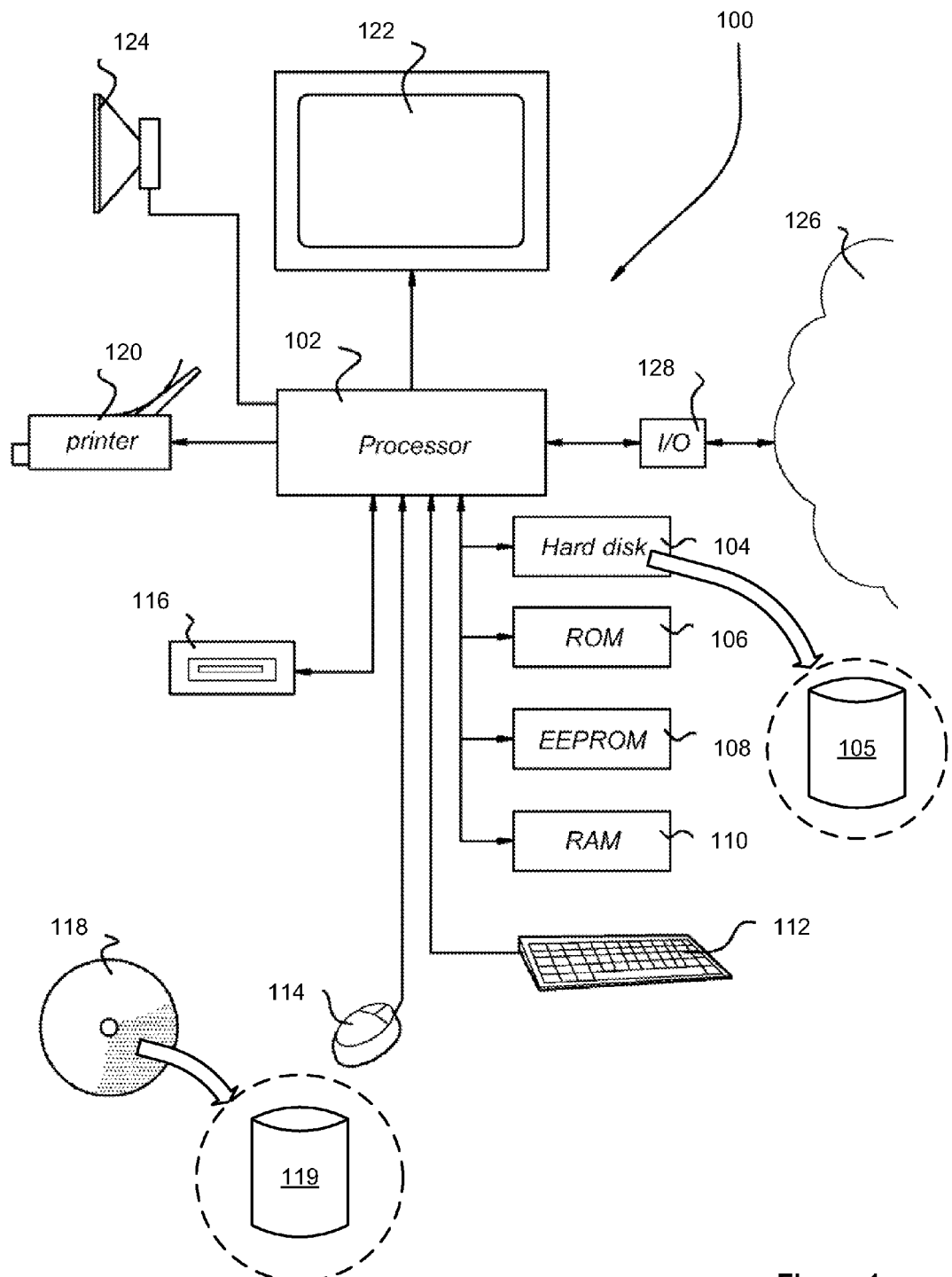
FIG. 1 is a schematic diagram of a computing arrangement that supports a geospatial feature data editor constituting an embodiment of the invention.

Throughout the following description identical reference numerals will be used to identify like parts.

Referring to FIG. 1, an overview is given of a computing arrangement 100 comprising a processing resource 102, for example a processor such as a microprocessor.

The processor 102 is coupled to a plurality of storage components, including a hard disk drive 104, a Read Only Memory (ROM) 106, an Electrical Erasable Programmable Read Only Memory (EEPROM) 108, and a Random Access Memory (RAM) 110. Not all of the memory types described above need necessarily be provided. Moreover, these memory components need not be located physically close to the processor 102 but can be located remotely from the processor 102. In this example, a master digital map database 105 and a number of resources (not shown) are stored on the hard drive 104. However, the skilled person will appreciate that the master digital map database 105 can be stored remotely from the computing arrangement 100, for example on a server (not shown) with which the computing arrangement 100 can communicate via a communications network, for example a Local Area Network (LAN).

The processor 102 is also coupled to one or more input devices for inputting instructions and data, by a user, for example a keyboard 112 and a mouse 114. Other input devices, for example a touch screen input unit, a trackball and/or a voice recognition unit, or any other input device, known to persons skilled in the art, can also be provided.

A portable media unit 116 is also coupled to the processor 102. The portable media unit 116 is arranged to read data from and/or write data to a removable data carrier or removable storage medium, for example a recordable Digital Versatile Disc (DVD), such as a DVD-R disc 118. In other examples, the removable data carriers can be, for example: tapes; CDs; or other types of DVDs, such as CD-Rs, CD-RWs, DVD-RWs, DVD-RAMS; or memory sticks as is known to persons skilled in the art. In this example, the DVD disc 118 is the destination for an export map database 119 constituting a map product to be sent to a customer. Of course, if desired the export map database 119 can simply be stored on the hard disk drive 104 for subsequent electronic communication to or download by the customer.

The processor 102 can be coupled to a printer 120 for printing output data on paper, as well as being coupled to a display 122, for instance, a monitor, such as an LCD (Liquid Crystal Display) screen, or any other type of display known to persons skilled in the art. The processor 102 can be coupled to a loudspeaker 124. Furthermore, the processor 102 can be coupled to a communication network 126, for example, a Public Switched Telephone Network (PSTN), the LAN mentioned above, a Wide Area Network (WAN), and/or the Internet by means of a data communications interface 128. The processor 102 can therefore be arranged to communicate with other communication-enabled equipment through the network 126.

The portable media unit 116 can also be used to receive, prior to insertion of the data carrier 118, another data carrier that can comprise a computer program product in the form of data and/or instructions arranged to provide the processor 102 with the capacity to perform a method as described later herein. However, such computer program product may, alternatively, be downloaded via the communications network 126, or be pre-loaded.

The processing resource 102 can be implemented as a stand alone system, or as a plurality of parallel operating processors each arranged to carry out sub-tasks of a larger computer program, or as one or more main processors with several sub-processors.

Furthermore, parts of the functionality described herein can even be carried out by remote processors communicating with processor 102 through the communications network 126.

The components contained in the computing arrangement 100 of FIG. 1 are those typically found in general purpose computer systems, and are intended to represent a broad category of such computer components that are well known in the art. Thus, the computing arrangement 100 of FIG. 1 can be a Personal Computer (PC), workstation, minicomputer, mainframe computer, etc. The computer can also include different bus configurations, networked platforms, multi-processor platforms, etc. Various operating systems can be used including UNIX, Solaris, Linux, Windows, Macintosh OS, or any other suitable operating system.

Of course, the above described hardware need not specifically be employed and other, alternative hardware configurations can be used. For example, assuming sufficient processing power is available, the hardware employed can be a so-called "Smart Phone" or Personal Digital Assistant (PDA) device. Indeed, processing can, if desired, be performed in a so-called "cloud" computing environment.

Figure 2:
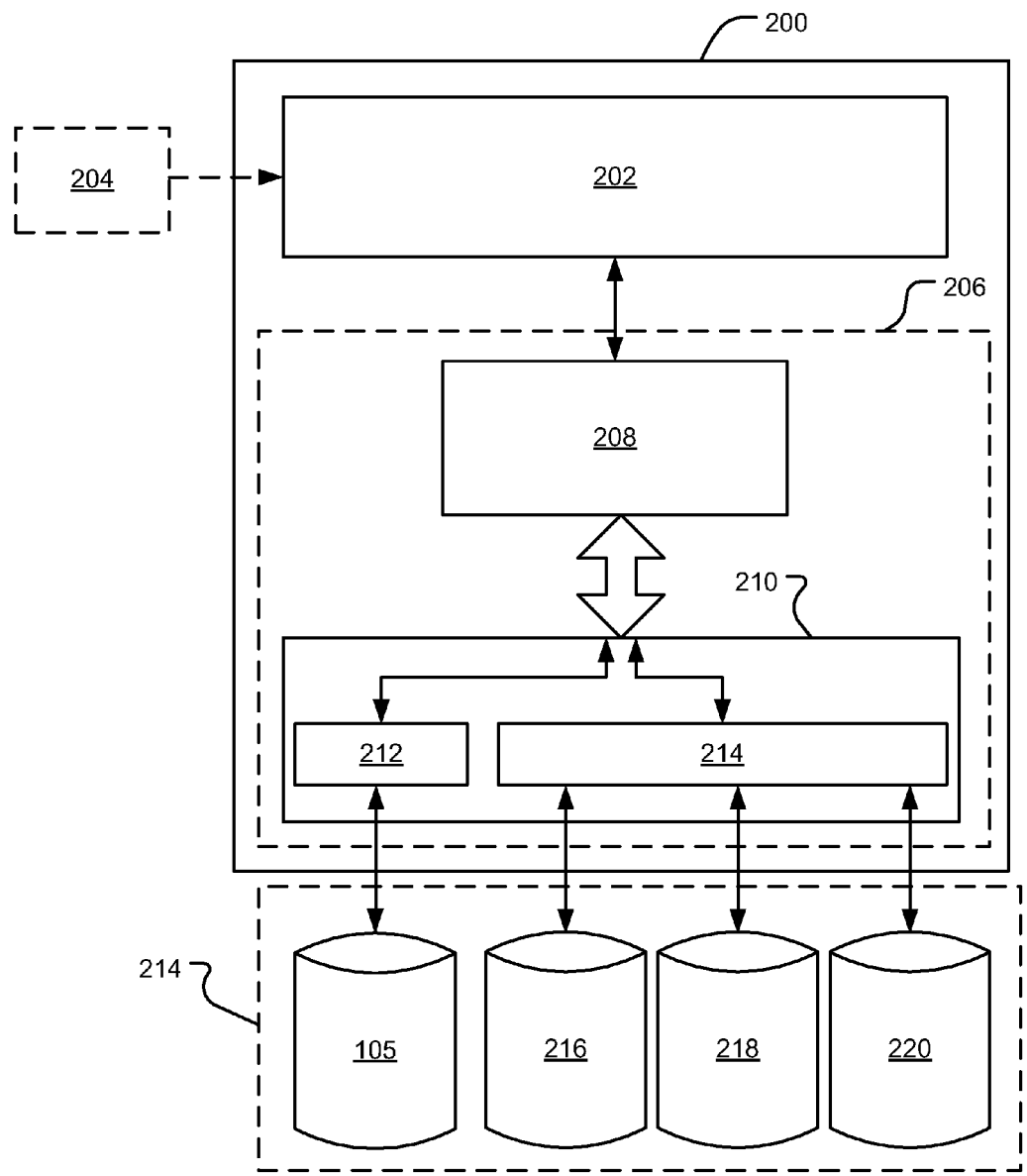
FIG. 2 is a schematic diagram of the geospatial feature data editor supported by the computing arrangement of FIG. 1.

Turning to FIG. 2, a geospatial object property assessment apparatus is implemented by, and so in this example comprises, the processing resource 102 supporting a number of functional modules to be described below. The geospatial object property assessment apparatus, in turn, provides a functional aspect of a geospatial object property assessment engine 200. The geospatial object property assessment engine 200 comprises a user interface control module 202 capable of interacting with a user interface supported by the operating system of the computing arrangement 100 so that interaction with the user (not shown), for example a Digital Map Technician (DMT), is possible. The user interface control module 202 is capable of receiving instructions and/or data 204 from the DMT, via the input devices, for example the keyboard 112 and the mouse 114. The user interface module 202 is also capable of providing information to the user, for example via the display 122 and/or the loudspeaker 124.

The processing resource 102 supports a geospatial object property processor module 206 capable of performing a number of functions and/or processes in relation to digital map data, for example a geospatial dataset, in response to data and/or instruction provided by the DMT. As most of the functionality of the geospatial object property processor module 206 is not directly relevant to the embodiments herein, for the sake of clarity and conciseness of description, only the parts of the geospatial object property assessment engine 200 relevant to the embodiments herein will only be described.

In relation to the geospatial object property assessment engine 200, the geospatial object property processor module 206 comprises an assessment processor 208 for assessing the quality of information content defining an attribute and/or a geometry. The geospatial object property processor module 206 is part of a data processing functionality module that supports various functional aspects of the geospatial object property assessment engine 200. However, in order not to distract from the teachings of this embodiment, only those functions relevant to the embodiments herein will be described in further detail. The assessment processor 208 is capable of communicating with the user interface control module 202 and a data retrieval processor 210 of the geospatial object property processor 206. The data retrieval processor 210 constitutes a data retrieval controller and comprises a subject data Input/Output (I/O) interface 212 for interacting with the master digital map database 105, and a resource data I/O interface 214 for retrieving data from one or more of a number of resources, for example databases. In this example, the resources constitute candidate resources and are stored on the hard disk drive 104 and include an aerial photography image database 216, a video log database 218 and a plat or plot map database 220. The identities of the candidate resources are stored in a resource log file (not shown) by, for example the geospatial object property processor 206, constitutes metadata. The resource log file also contains details of when each resource was acquired or captured. The skilled person should, however, appreciate that the above types of resources are mentioned as examples only and any other types of suitable resources can be employed.

In the above example, the geospatial object property assessment apparatus is part of a geospatial object property assessment system that also includes the master digital map database 105 and at least one of the databases constituting the candidate resources.

The above-described geospatial object property engine can be used in relation to a number of different applications, for example, in relation to geospatial database editing or automated assessment of candidate resource data, such as for automated assessment of resources is used for conflation. Hereinbelow, example applications of a geospatial database editor and conflation are described.

In relation to a geographic feature data editor comprising the geospatial object property assessment engine, the DMT identifies a geographic feature that is to be analysed to determine whether any attributes or geometry need to be updated. The need to update one or more attributes relating to the geographic feature can arise from a complaint received by a producer of map products, for example from a customer that purchases map products or even a member of the public that is discontent with the representation of a geographic feature relating to them. Of course, other events that trigger a need to investigate an attribute or geometry of a geographic resource are conceivable.

Figure 3:
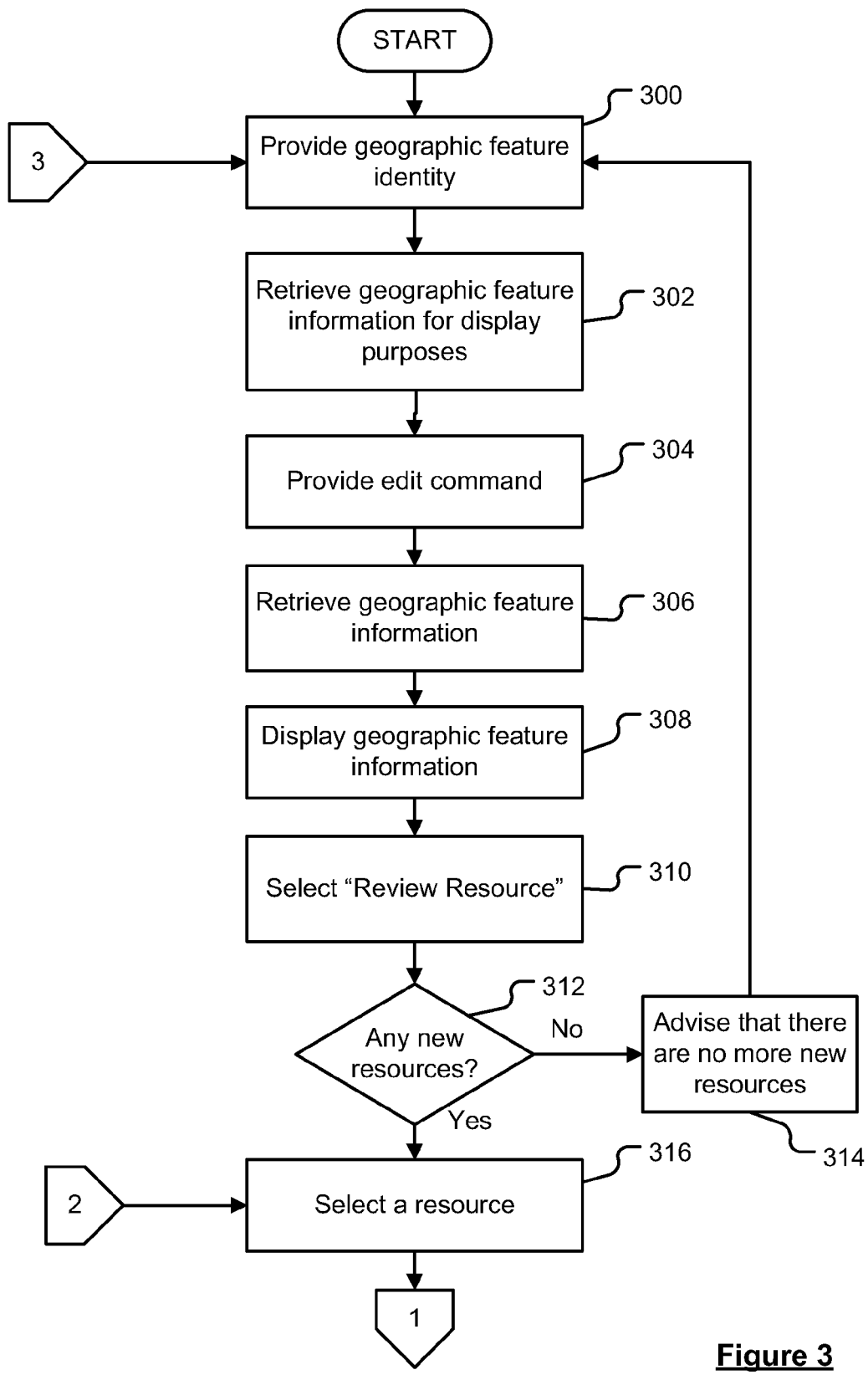
FIG. 3 is a first part of a flow diagram of a method of updating information content of an attribute of another embodiment of the invention.
Figure 4:
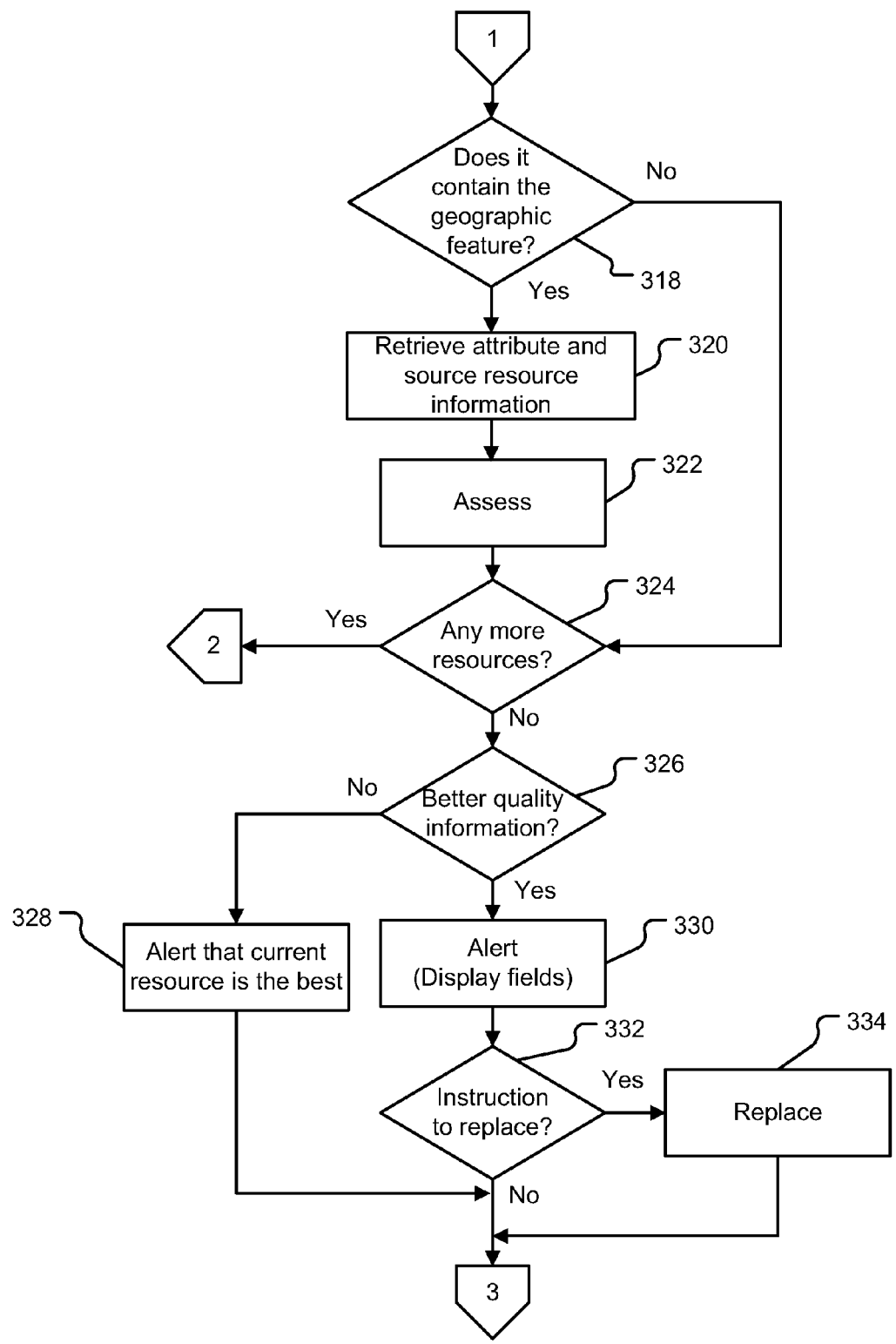
FIG. 4 is a second part of the flow diagram of FIG. 3.
Figure 5:
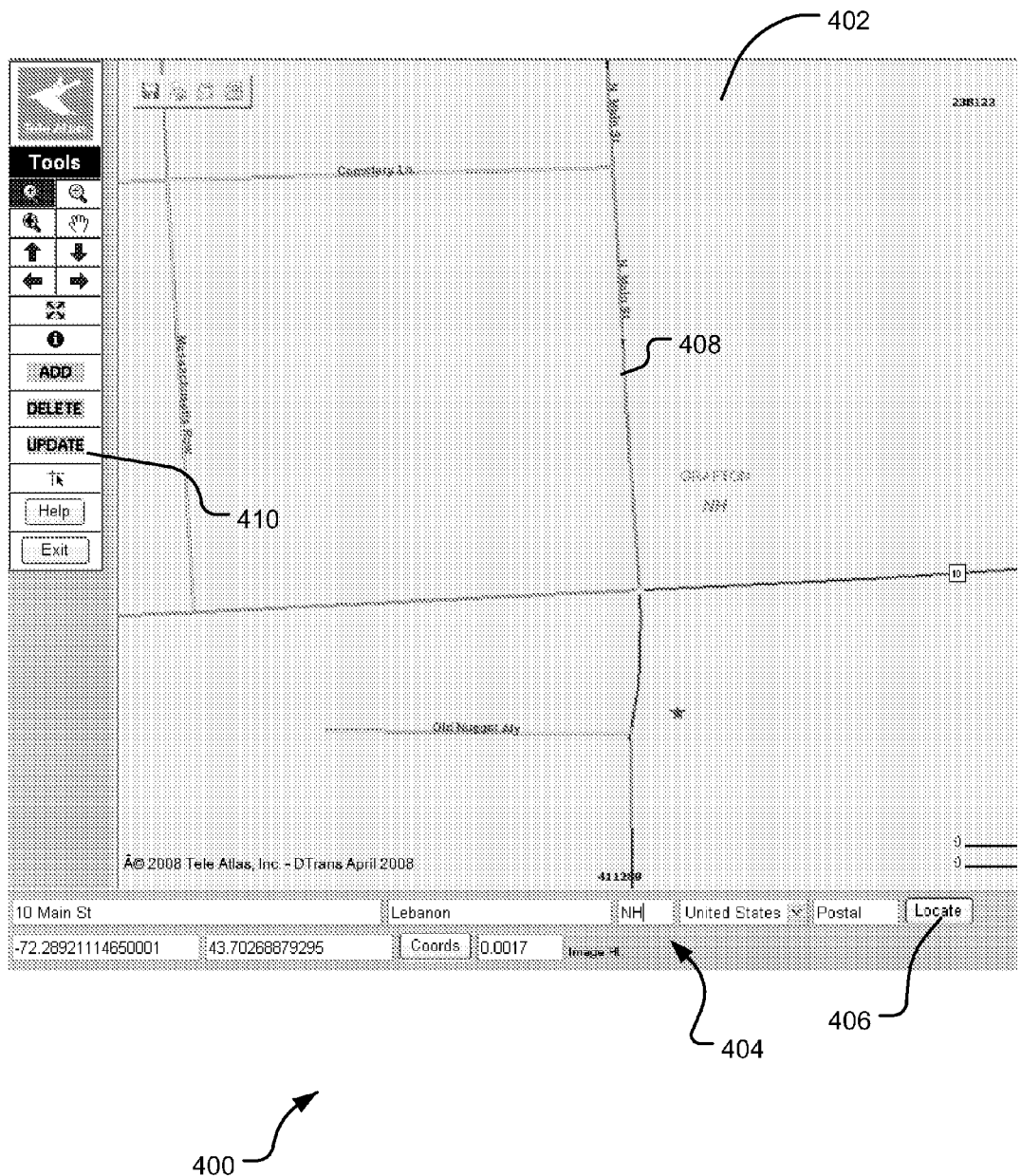
FIG. 5 is a screen shot of a main console generated in respect of the geographic feature data editor of FIGS. 1 and 2.

Referring to FIG. 5, the DMT operates a geographic feature data editor via a main console 400 (FIG. 4) supported by the user interface control module 202 and the user interface of the operating system in order to retrieve geospatial data from the geospatial dataset stored in the master digital map database 105 for graphical presentation in a map display pane 402. In this respect, the DMT provides (Step 300; FIG. 3) a street address, for example 10 Main Street, Lebanon, N.H., USA. This information is provided via an address data input pane 404 comprising fields for data input to identify the address and a "Locate" virtual button 406, which the DMT selects via the mouse 114 after inputting the address data.

In response to the DMT clicking on the Locate virtual button 406, the request to display a geographic area comprising the address specified in the address data input pane 404 is passed to the data processing functionality module mentioned above and the necessary geospatial data is retrieved (Step 302) from the master digital map database 105 and interpreted and displayed in the map display pane 402, the geospatial data retrieved including geographic feature information associated with the street address provided as well as geographic feature information associated with a predetermined surrounding area. In this example, the street address provided relates to a geographic feature, namely a road segment, and so the geographic feature information associated with the street address relates to the road segment.

As mentioned above, the geographic feature information is part of the geospatial dataset, the geospatial dataset containing digital representations of geometric or geographic objects and associated attribution. Examples of such geometric or geographic objects and associated attribution include a street centreline vector that is represented by geographic coordinates of points that lie on the street centreline and attributes, for example the speed limit for this length of street and/or the name or names of the street and the ranges of addresses that occur along the street.

In order to edit (Step 304) the geographic feature information associated with the geographic feature, the DMT selects the road segment 408 using the mouse 114 and then clicks on an "Update" virtual button 410. Thereafter, the instruction (the update command) 204 (FIG. 2) and the data (the identity of the geographic feature to be updated) are passed by the user interface control module 202 to the geospatial object property processor module 206, which responds by retrieving (Step 306) from the master digital map database 105, via the subject data I/O 212 of the data retrieval processor 210, the geographic feature information associated with the geographic feature selected (the road segment 408 in this example), which is an example of a first metadata associated with quality of current source information used to define a property, for example a geometry or an attribute, of a geospatial object. The geospatial object property processor module 206, with the assistance of the user interface control module 202, then displays (Step 308) the geographic feature information in an editing window 500 (FIG. 6) after receipt thereof, the fields of the geographic feature information being displayed in a field editing pane 502.

Figure 6:
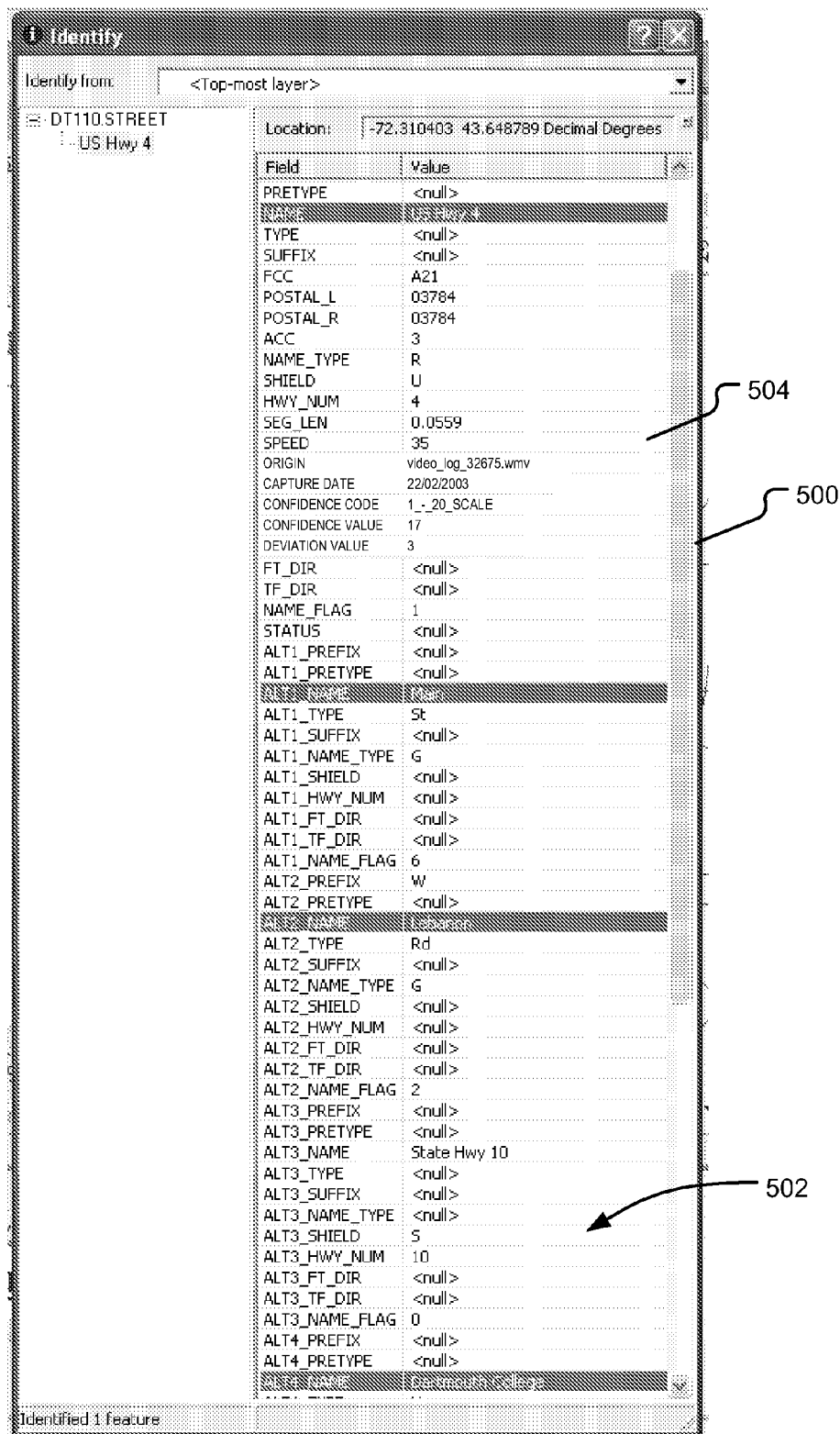
FIG. 6 is another screen shot of an attribute advice window generated in relation to the geographic feature data editor of FIGS. 1 and 2.

As can be seen from FIG. 6, the geographic feature information associated with the road segment 408 selected comprises a significant number of pieces of information. In addition to geographic coordinates (an example of geometry) that define the location of the road segment, there is a variety of other properties, for example attributes, which pertain to the road segment. One such attribute is a SPEED attribute 504. In this example, the speed for the selected road segment 408 is 35 kph. However, the DMT has been advised that this may not be accurate and so has been asked to investigate whether the SPEED attribute 504 of the geographic feature is current and accurate.

In order to achieve this aim, after the editing window 500 has been displayed, the DMT actuates a right-hand button of the mouse 114 and a menu (not shown) is generated and displayed by the user interface control module 202 and the user interface of the operating system adjacent a mouse icon on the screen (not shown). The DMT is thus provided with an option to "review resource", namely the resource used to generate the information content for the SPEED attribute 504, namely "35 kph". Upon selection (Step 310) of the "review resource" option, the selection is communicated back to the geospatial object property processor module 206 via the user interface control module 202 along with the property-identifying, for example attribute-identifying, data identifying, for example the attribute of the geospatial object. In this example, the user interface control module 202 serves as a property identity input for receiving the property identifying data, which is generated at the behest of the DMT.

At this stage, it should be appreciated that current source information provides the first metadata, for example an indicator of quality of information content, and is stored in the master digital map database 105 in order to support an assessment of the fitness of a currently employed resource of attribute information content to be used to derive the information content for the SPEED attribute 504. In this example, the currently employed resource is video log data acquired in the year 2007 and datestamped 20 Jan. 2007. Consequently, the source resource information comprises a file name to identify the resource, namely the particular 2007 video log used and/or a unique reference to identify the resource used. Furthermore, other properties of the currently employed resource are stored as part of the source resource information, for example the datestamp information.

Additionally, in relation to the particular attribute, the source resource information also comprises specific assessment data or metadata as mentioned above, details of which will now be described.

The first and second metadata each comprises confidence class data, confidence value data and, optionally, deviation value data. The confidence class data is classification data relating to the manner in which a property, for example a type of attribute, is to be rated as measured, for example a category of quality rating appropriate for the attribute. In this regard, the confidence class can be a predetermined scale to be employed for a given type of attribute, for example a scale of 1-20 or a traffic-light type scale. Furthermore, it should be appreciated that different attributes of a given geographic feature can have different confidence class data associated therewith, for example one confidence class for use in relation to positional accuracy of the road segment geometry 408 and another confidence class for completeness and accuracy of street names.

The confidence value is an actual quality indicator for the information content of the attribute in accordance with the confidence class associated with the attribute. In this respect, the confidence value can be expressed as an indication of accuracy, for example in the case of aerial photography. The values are assessed manually and, optionally, employing heuristic techniques, and can factor in various aspects associated with the attribute, including but not exclusively completeness of a population of attributes over a resource and collection methodology, for example a survey method to compile a plot map or an altitude of collection of aerial photographs.

The deviation or adjustment value is a measure of a variation or a compensation factor in quality of the information content of the instance of the attribute. For example, a confidence value associated with a speed limit can require compensation due to the sign showing the speed limit being obscured by vegetation and so cannot be read or reliably read. The deviation can be expressed as a percentage, although this is not mandatory, and the deviation value can be expressed as a scalar value or a function.

The source resource information associated with the instance of the SPEED attribute relating to the geographic feature, namely the road segment 408, therefore comprises the confidence class data, the confidence value data and the deviation value data associated with used information content for the instance of the SPEED attribute for the road segment 408 stored in the master digital map database 105. The source resource information therefore comprises an indicator of quality of used information content associated with an attribute, in this example the SPEED attribute, of a geographic feature for a geospatial dataset, in this example the road segment 408. The first metadata of the source resource information also comprises a first resource identifier for identifying the currently employed resource of attribute content information; this can include date of acquisition or capture information.

Figure 7:
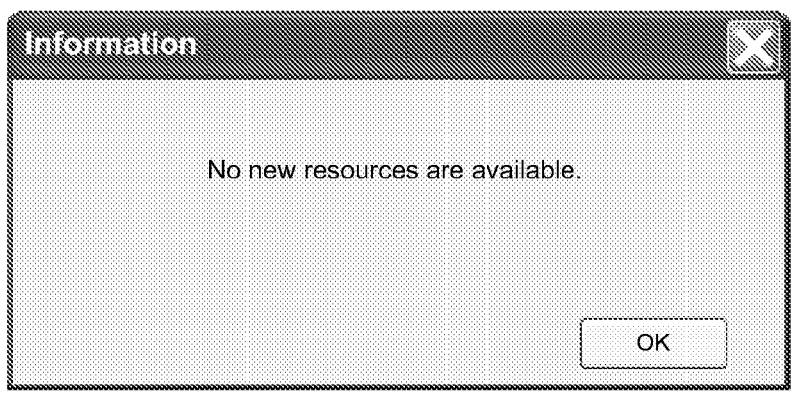
FIG. 7 is a screen shot of an alert window.

Upon receipt of the review resource instruction mentioned above and initiated by the DMT, the assessment processor 208 of the geospatial object property processor module 206 retrieves the source resource information for the SPEED attribute stored by the master digital map database 105 via the subject data I/O interface 212 constituting, in this example, a subject data input. In this regard, the data retrieval processor 210 requests retrieval of the source resource information. Additionally, the assessment processor 208 reviews the resources registered in the resource log file and, in this example, analyses each resource in order to determine (Step 312) whether any of the identities of resources stored in the resource log file relate to resources acquired or captured more recently than the currently employed resource that was used to provide the information content currently employed for deriving the SPEED attribute 504. In this regard, if no more recently acquired resources are available, the assessment processor 208 advises (Step 314) the DMT, through an alert message (FIG. 7) presented in a window by an alert generator (not shown), via the user interface control module 202 and the user interface of the operating system, that no more new resources are available and the geographic feature editor reverts to awaiting input in relation to a geographic feature by returning to displaying the main console 400 (FIG. 4). However, if one or more recently acquired or captured resources have been registered in the resource log file, the assessment processor 208 selects (Step 316) a first resource identified as newly acquired or captured, for example the aerial map database 216, and searches (Step 318; FIG. 4) the selected resource, constituting a candidate information content resource, for the existence of the geographic feature, in this example the road segment 408. If the road segment 408 is not featured in the candidate information content resource, the assessment processor 208 determines (Step 324) if other more recently acquired resources are available for analysis as will be described in further detail later herein.

Alternatively, if the aerial photography database 216 comprises an image showing the road segment 408, namely the geographic feature selected initially by the DMT, the assessment processor 208 retrieves (Step 320) data relating to the geographic feature, and in particular candidate information content associated with the attribute of interest, namely the SPEED attribute 504. In this example, an aerial photograph of the road segment is highly unlikely to show road signage, in particular speed limit signs, with sufficient clarity to enable the candidate information content to be ascertained from the aerial photography data.

However, in order to have an objective awareness of quality, in particular a lack of quality in the present example relating to speed limit signage in the aerial photography database 216, candidate resource information for geographic features of the geographic photography database 216 is stored in the aerial photography database 216, and indeed correspondingly similar candidate resource information is stored in the other candidate resources databases 218, 220. The candidate resource information is analogous to the source resource information mentioned above in relation to the master digital map database 105, and comprises the confidence class data, the confidence value data and, optionally, the deviation value data, associated with the instance of the attribute being analysed as a result of the selection by the DMT. Hence, in addition to retrieval of the candidate information content associated with the SPEED attribute, the assessment processor 208 retrieves, via the resource data I/O interface 214, the candidate resource information relating to, in this example, the SPEED attribute. In this example, the resource data I/O interface 214 constitutes a resource data source input. The candidate resource information therefore comprises an indicator of quality of candidate information content associated with the attribute, in this example the SPEED attribute, of the geographic feature, and a second resource identifier for identifying the candidate information resource to be considered. The data retrieved is an example of second metadata associated with quality of the candidate resource information content for updating the definition of the property of the geospatial object. The data retrieval processor 210 requests retrieval of the candidate resource information.

Once the source resource information data and the candidate resource information data have been retrieved, the assessment processor 208 then assesses (Step 322) the candidate information content originating from the aerial photography database 216 in accordance with a predetermined ruleset in the following manner. Indeed, the assessment processor 208 uses the first metadata and the second metadata in accordance with the predetermined ruleset in order to determine whether the candidate resource information content constitutes a qualitatively better resource to define the property of the geospatial object than the current source information content.

In this example, the predetermined ruleset comprises a requirement to calculate a score or "trumping" value, the score being calculated by the assessment processor 208 using, in this example, the confidence value, the deviation value and an indication of when the candidate information content was collected, for example a collection date. The assessment processor 208 firstly, using the indication of the date of collection of the candidate information content, calculates the age, in months of the candidate information content in respect of the date of collection. Thereafter, the assessment processor 208 uses the confidence value, the deviation value and the calculated age in order to evaluate the following equation:

$$s=((v_c+v_d)*m)-f_d \qquad (1)$$

where:
s is the score;
$v_c$ is the confidence value;
$v_d$ is the deviation value;
$f_d$ is a degradation factor, and
m is multiplier in months used to support degradation by a percentage point for m months.

In this example, the degradation factor, $f_d$, is the age of the candidate information content calculated. Consequently, the degradation factor is a scalar. However, the skilled person should understand that the degradation factor can be evaluated as a function. It should be appreciated that such functions are dynamically configurable.

The same equation is used, in this example, to calculate a score or trumping value in respect of the SPEED attribute of the master digital map database 105 being investigated. The confidence value, the deviation value and an indication of when the used information content was collected is obtained from the source resource information and used to evaluate equation (1) in respect of the used information content associated with the SPEED attribute of the master digital map database 105 currently under investigation.

It should be appreciated that the above equation is an exemplary equation for scoring information content. In this regard, the skilled person should appreciate that the technique employed to calculate the scores, and hence criterion or criteria, can differ between resources, within resources, or even between attributes, for example attribute types, such as SPEED attributes and STREET NAME attributes. Consequently, the use of different equations or formulae in the predetermined ruleset is contemplated. For example, different calculations can allow different time degradations and/or time degradations to have different weight in the calculations for different attributes within a resource, for different types of resources, or parts of a resource.

Furthermore, in relation to any equation employed, the equation can include numeric constants, variables, for example of the type listed above, algebraic operands, including addition, subtraction, multiplication, division and exponentiation, functions, including but not limited to functions relating to date calculations, such as YEARS_OLD( ), MONTHS_OLD( ) and/or DAYS_OLD( ), prioritised lists of variables and/or default values. The prioritised list of variables can be used in order to allow use of alternative variables when a given variable does not exist, for example a calculation can be performed based upon a currency date, but if this is not available a date of application of the data can be employed. The default values can be used when a value is not available for a variable, for example when calculating the number of months that have elapsed since a currency date, if the currency date is not available, a default value of, for example, 60 months old, can be employed. These options can be included in the predetermined ruleset. The currency associated with a geospatial object is a useful metric, because initial accuracy of geospatial data can differ between geospatial datasets and can degrade at different rates or at like rates, but may be of different ages. Consequently, a first geospatial dataset may be 100% accurate at the date of creation, but may have degraded in quality sufficiently for a more recently created second geospatial dataset to be more accurate than the first geospatial dataset even though the second geospatial dataset was only 98% accurate at the date of creation thereof.

Furthermore, additional factors not employed in the above equation can be used. For example, the following factors can be employed: a current date, a current date of a resource, a date of application of a confidence value (implying an association between a geographic feature of a resource or an attribute thereof and the resource), a core overall goodness rating for a resource (for example, a percentage value), a quality rating of a method of application and/or a training rating relating to a human operator doing the work in order to take into account the difference in quality of work output between different editors. In relation to the quality rating, an example of the quality rating for the method of application is that for certain types of features, algorithmic data updates result in higher quality work, because algorithms are not subject to human error, while for other types of updates, the human brain is superior to an algorithm on account of the ability to reason.

After calculation of the score for the candidate information content associated with the selected resource, the assessment processor determines (Step 324) whether any more newly acquired or captured resources are registered in the resource log file and if further candidate resources remain to by analysed, the above process is repeated (Steps 316 to 324) until all the newly acquired candidate resources have been considered. Otherwise, if no further newly acquired candidate resources are available, the assessment processor 208 analyses the scores calculated in respect of the candidate resources that have been newly acquired and determines (Step 326), for example by comparison in accordance with the predetermined ruleset, whether the scores are higher than the current score calculated in respect of the used information content currently used in respect of the SPEED attribute. The objective is to determine whether the candidate information content constitutes a qualitatively better resource than the used information content.

In some embodiments, a so-called tolerance factor can be employed in the predetermined ruleset in relation to the information content associated with the attribute under investigation. The tolerance factor need not be a scalar and the skilled person should appreciate that the tolerance factor can be derived based upon a function. In another embodiment, the tolerance factor can be used by the assessment processor 208 when assessing in accordance with the predetermined ruleset scores calculated in order to determine when there is merit in performing an update of information content associated with the attribute under investigation. For example, the assessment processor 208 can be arranged to decide that the update is required only if a score associated with candidate information content exceeds the score calculated in relation to the used information content by the tolerance factor. Indeed, as mentioned above, the tolerance factor need not be a simple scalar value and can be expressed differently, for example as a percentage difference between scores being assessed.

Figure 8:
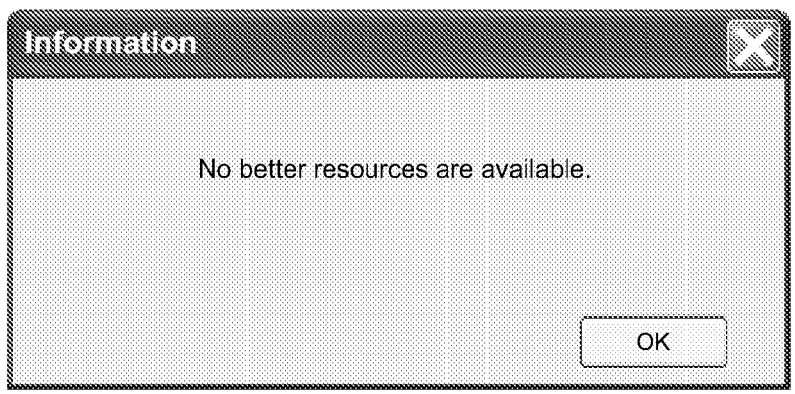
FIG. 8 is a screen shot of another alert window.
Figure 9:
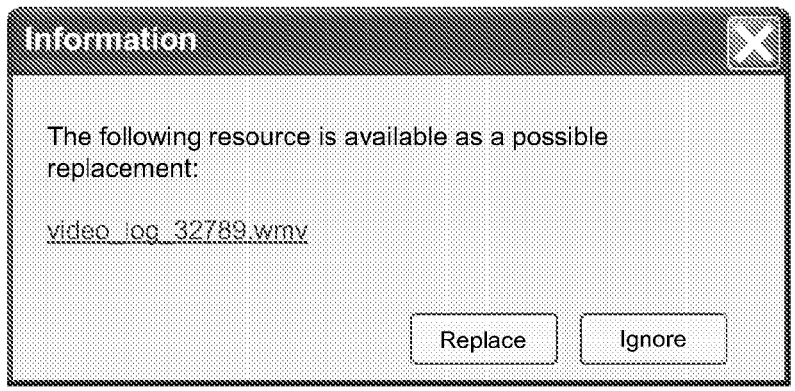
FIG. 9 is a screen shot of yet another alert window.

Returning to FIG. 4, if no higher or better score currently exists, the assessment processor 208, via the user interface control module 202 and the user interface of the operating system, alerts (Step 328) the DMT, for example using an alert window (FIG. 8), that the currently employed resource is the best resource available for derivation of information content associated with the SPEED attribute under investigation. Alternatively, if a superior evaluation result, in this example a better score, has been found, the assessment processor 208, via the user interface control module 202 and the user interface of the operating system, selects one of the other candidate resource information contents, such as one having the most superior score associated therewith, and alerts (Step 330) the DMT using the alert generator (not shown), for example using an alert window (FIG. 9), that a more recently acquired candidate resource is available that potentially has candidate information content that can be used to define the SPEED attribute. The alert identifies the candidate information content for the DMT to review, for example a clip of a video log from the video log database 216, along with a request (Step 332) for further instructions as to whether to replace the current used information content derived from the currently employed resource with the candidate information content derived from the candidate resource. In this regard, after an optional review of the candidate information content, if the DMT wishes to use the candidate information content, the indication to use the candidate information content is provided to the assessment processor 208 by selection by the DMT via the alert window (selection of a "Replace" button). Thereafter, the assessment processor 208 replaces (Step 334) the current information content used for the SPEED attribute under investigation with the candidate information content and, using the subject data I/O 212 of the data access processor 210, stores, in the place of the used information content and source resource information associated with the currently employed resource of attribute information content, the candidate information content associated with the SPEED attribute in the master digital map database 105 and the candidate resource information associated with the candidate information content. An updated association or affiliation is therefore created between the attribute and the candidate resource. It should be appreciated that while, in this example, data editing functionality of the data editor is employed, in other embodiments the geospatial object property assessment apparatus can comprise a data editor to perform necessary updating of data as described herein.

After the update has taken place, or if the DMT decides that replacement of the current information content for the SPEED attribute is not appropriate (selection of "Ignore" button), the geographic feature editor reverts to awaiting input in relation to a geographic feature by returning to displaying the main console 400 (FIG. 4). Hence, the above process can be repeated in relation to other properties, optionally of another geospatial object, and the same or other source resource information content and the same or other candidate resource information content.

Whilst the above examples have been described in the context of the road segment 408, the skilled person should appreciate that alternate attributes can be employed in relation to other types of geographic features, for example business premises or a point of interest.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, in another embodiment, the predetermined ruleset can be arranged to permit used information content associated with an attribute under investigation to be updated or identified as suitable for updating only after a predetermined number of other attributes associated with a same currently employed resource as the currently employed resource associated with the attribute under investigation have been determined as having respective information content that has been superseded by respective candidate information content.

Indeed, in another embodiment, where the assessment processor 208 has, following calculation and assessment of scores, determined that used information content derived from the currently employed resource should be replaced with candidate information content derived from one of the candidate resources in respect of the attribute under investigation, the assessment processor 208 can be arranged to identify one or more other attributes, for example of the same type as the attribute under investigation, stored in the master digital map database 105 that have source resource information indicating an association between the respective attributes and the currently employed resource. The above process of assessing and updating the information content for the attributes found can then be performed in order to ensure that the attributes found are also as accurate as possible, and where necessary updated.

In another embodiment, the geographic feature editor can be arranged to manage the resource information relating to attributes of geographic features, for example associations between attributes and resources and/or confidence values. In this regard, an edit performed to a geographic feature, for example a road segment, such as splitting an edge feature of the road segment, can require management of the source resource information relating to the edited geographic feature. In one example, the source resource information can be inherited where a new geographic feature is created. However, the source resource information can be invalidated and/or not inherited where it is inappropriate to use the source resource information, for example in relation to positional accuracy where the road segment is split and one part is moved to a new location.

In this respect, if desired, a matrix of map database editing actions can be created and used by the geographic feature editor in order to provide a record of relationships between existing resource affiliations and types of map database edits, the matrix comprising actions that the geographic feature editor needs to enforce in relation to the management of the resource information in response to edits that are performed in relation to geographic features, thereby preventing errors being introduced to attributes as a result of the editing process. The matrix can maintain a record of actions and how confidence values and/or confidence codes should be handled in response to such actions.

In yet another embodiment, instead of providing the geographic feature editor to perform the functionality mentioned above, the skilled person should appreciate that the above functionality can be provided by an automated apparatus, for example a database updating apparatus comprising the geospatial object property assessment apparatus, that does not require a DMT to specifically identify geographic features that require investigation as to whether or not updating is required. Furthermore, if desired, the assessment processor 208 of the database updating apparatus can be arranged to execute updates, following assessment, without reference to the DMT for confirmation to perform an update.

In a further embodiment, instead of use of the geospatial object property assessment engine 200 with the geospatial database editor, the geospatial object property assessment apparatus can be arranged to perform periodic scans of candidate resources in order to identify better resources than currently employed to provide attribution and/or geometry data for one or more geographic features of the geospatial dataset. In such an embodiment, instead of the DMT identifying individual geographic features from a master digital map database, the geospatial object property assessment apparatus performs the periodic scans in order to determine if the source material that was used to create attribution or geometry falls below a specific quality threshold. For example the position accuracy of a road segment may be specified as +/−10 meters based on the source for the geometry. New specifications for this layer might require that positional accuracy to be +/−3 meters, in which case the segment in question would need to be resourced with information of increased accuracy.

Figure 10:
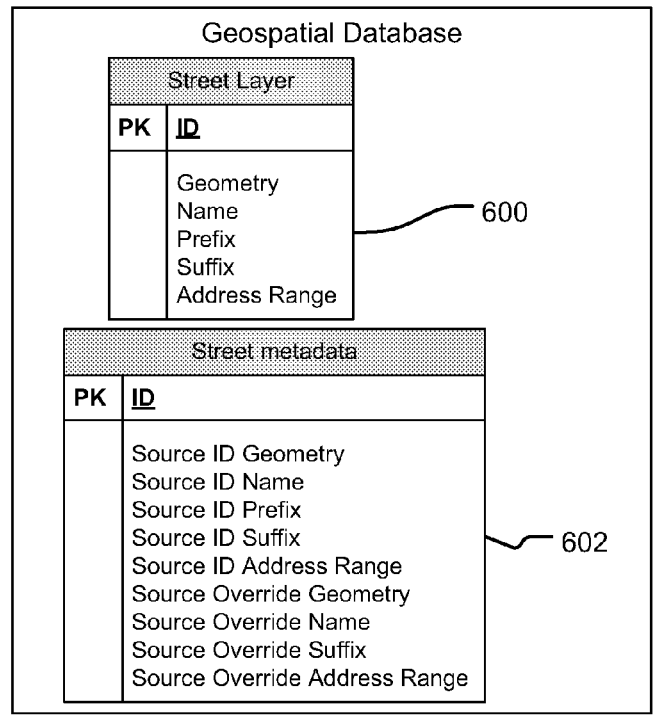
FIG. 10 is a schematic diagram of a data structure of a geospatial database.

In order to support the above embodiments, various different data structures can be employed. Referring to FIG. 10, the master digital map database/geospatial database 105 stores the metadata in order to hold information for assessment of geospatial objects and a relationship between the information for assessment and the respective geospatial objects. For example, a linked table arrangement can be employed, where a data structure, such as a first table 600 comprises data defining a geospatial object. In this example, the first table 600 comprises geometry data, name data, prefix data, suffix data and/or address range data. The first table 600 also comprises a linking identifier (ID). A second table 602 comprises metadata for use when assessing the geospatial object. In order to establish a relationship with the first table 600 and hence the geospatial object, the second table 602 also comprises the linking ID.

The second table 602 comprises, in this example, a source ID for the geometry data, a source ID for the name data, a source ID for the prefix data, a source ID for the suffix data and a source ID for the address range data. Additionally, in this example, the second table 602 also comprises override data for the geometry data, override data for the name data, override data for the prefix data, override data for the suffix data and override data for the address range data. The purpose of the override data mentioned above will be described later herein.

As described above, separate source ID fields are employed for each field of the first table 600 associated with the geospatial object. However, it should be appreciated that a fewer number of source IDs can be employed to associate a source of data with the fields, for example a single source ID.

In this example, provision is made to record different source IDs in respect of different geospatial objects. However, a single or smaller number of source IDs can be employed to record an association between the source ID(s) and respective geospatial objects.

Referring back to the override data mentioned above, each override data field is provided to store an override value associated with a respective source ID field in the second table 602. In some instances, an indicator of quality can vary geographically and/or temporally within a given resource. Where the actual quality is below a predetermined threshold, in respect of geometry data and/or attribute data, the relevant override data can be used to substitute for the indicator of quality associated with the data stored in the first table 600. For example, a street level video can be used to extract street signs. Normally, the street level video (the resource) is nearly 100% accurate. However, in a small number of instances, signs are obscured. In such circumstances, the override data can be applied manually by a DMT in order to override a confidence code automatically assigned to the property of the geospatial object (the street).

Figure 11:
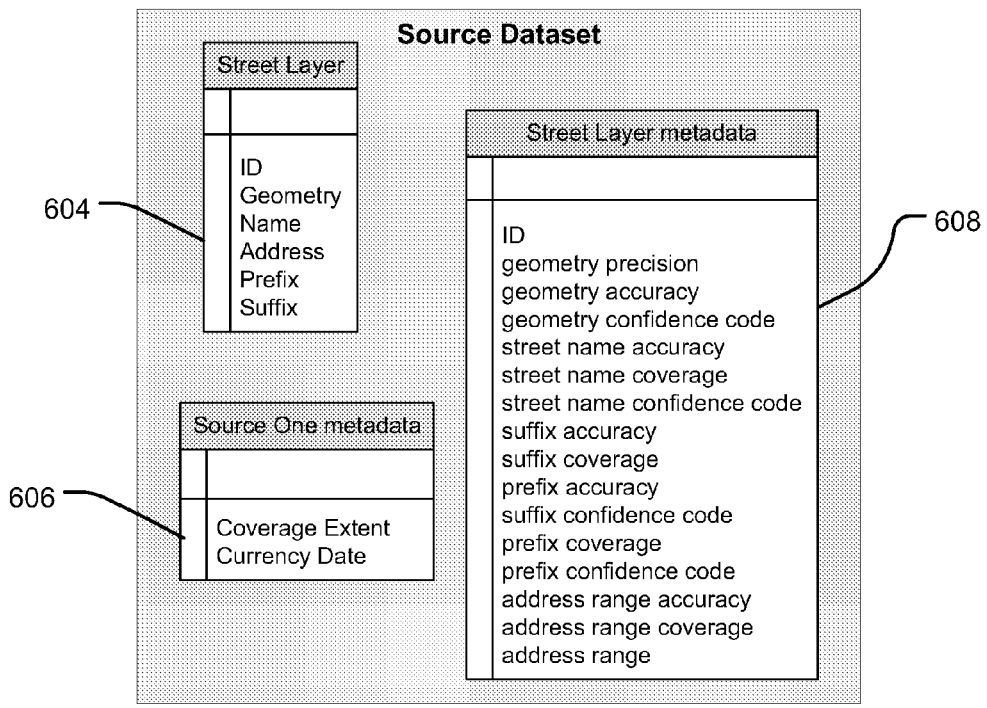
FIG. 11 is a schematic diagram of a data structure of a geospatial dataset.

As mentioned above, the source ID for each attribute or geometry of each geospatial object is related to a resource via the source ID field of the second table 602. Referring to FIG. 11, the source ID relates to a source dataset or resource. The source dataset comprises geometry and attribute data, for example in a third table 604, which were used to source the street layer of the geospatial dataset of FIG. 10. Although, in this example, a single source dataset is associated with all individual attributes, the skilled person should appreciate that different source datasets can be used for each individual geometry and/or attribute or type of geometry and/or attribute.

In addition to the third table 604, the source dataset comprises a fourth table 606. The fourth table 606 comprises geographical coverage extent data and currency data. In this example, the geographical coverage extent data and currency data relate to all the geometry and attribute data of the third table 604.

To be relevant, the source dataset needs to comprise at least one attribute or geometry in common with the geospatial dataset. Although not employed in this example, the source dataset can comprise individual metadata identifying when each individual attribute and/or geometry of the source dataset was last updated, this additional metadata being usable to determine currency of individual attributes and/or geometry.

In addition to the metadata relating to geographical coverage extent and currency data, the source dataset can comprise further metadata, for example in a fifth table 608, the further metadata relating to parameters associated with quality of data of the source dataset for a given geospatial object. In this example, the fifth table 608 comprises the linking ID to record a relationship between a geospatial object and the further metadata associated with the geospatial object. The fifth table 608 also comprises geometry precision data, geometry accuracy data, geometry confidence code data, name accuracy data, name coverage data, name confidence code data, suffix accuracy data, suffix coverage data, suffix confidence code data, prefix accuracy data, prefix coverage data, prefix confidence code data, address range accuracy data, address range coverage data, and/or address range confidence code data. Of course, these types of data are exemplary and other resource datasets can comprise different collections of further metadata.

In the present example, it should be appreciated that when the source dataset or any other resource dataset is acquired, the dataset has to be assessed or rated for quality and the class of attribute(s) or geometry (geometries) with which the dataset can be used. As mentioned in relation to the previous embodiments, quality of a dataset is measured in terms of confidence code. In this regard, the quality assessment is in respect of each type or class of attribute or geometry and for each "layer" of geospatial objects.

Furthermore, as explained above, the indicators of quality can be calculated in accordance with different methodologies, the methodologies depending, for example, upon the type of resource being assessed. In the example of FIG. 11, the fifth table 608 comprises fields of precision and accuracy of the geometry. The precision and accuracy are metadata used to determine the confidence codes mentioned previously. The precision and accuracy can be measured in a number of different ways, for example the precision and accuracy can be the precision and accuracy of a given GPS device used to measure the geometry. The precision and accuracy can be expressed in statistically-related units, for example standard deviations (in meters).

In this example, as mentioned above, the quality of a dataset is determined using, at least, the currency of the dataset and the geographical extent. However, the accuracy and/or precision mentioned above can also be used to improve the quality value determined. Each parameter can be measured and weighted in different ways; the weighting and measurement techniques employed can depend upon the type of attribute or even the exact attribute. However, between resource datasets, it is desirable to be consistent in the measurement and/or weighting technique employed.

In this example, and other examples, "accuracy" is a measure of proximity, for example on average, a measurement is to an actual value. "Precision" is a measure of how often a sensor or method of measurement yields a same or similar result, i.e. a degree of consistency. The geographic extent can be represented as a percentage to indicate a degree of coverage a type of attribute has over a given dataset, for example the given dataset may cover 90% of all roads as at a stated currency date. As intimated above, the "currency" is a date when the dataset (resource) is supposed to reflect reality. If desired, individual dates can be recorded to reflect when each geospatial object was updated or a type of geospatial object was updated.

Using the above quality measures, the confidence codes can be calculated, examples of which have already been described above. If desired, a quality measure can be "normalised", for example by taking into account a range of the quality measure. By way of example, in the context of positional accuracy of geometry, such as a given point on a street layer, if positional accuracy is ±3 meters, and excellent positional accuracy is ±1 meter and ±10 meters is extremely poor accuracy, when calculating a confidence code using the positional accuracy as a measure of quality, the actual positional accuracy is divided by the range of the positional accuracies (10-1).

As should be appreciated, confidence codes change with time, for example as more roads are built, and/or accuracy and/or precision values may change as a resource is analysed further, for example using a new analysis technique. Consequently, it is desirable to recalculate confidence code values periodically.

Figure 12:
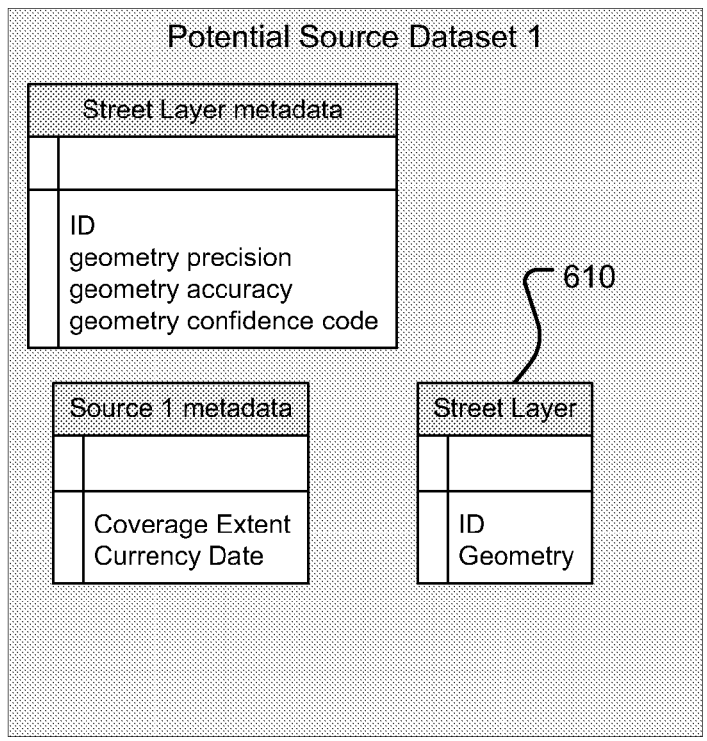
FIG. 12 is a schematic diagram of a data structure of a first candidate geospatial dataset.
Figure 13:
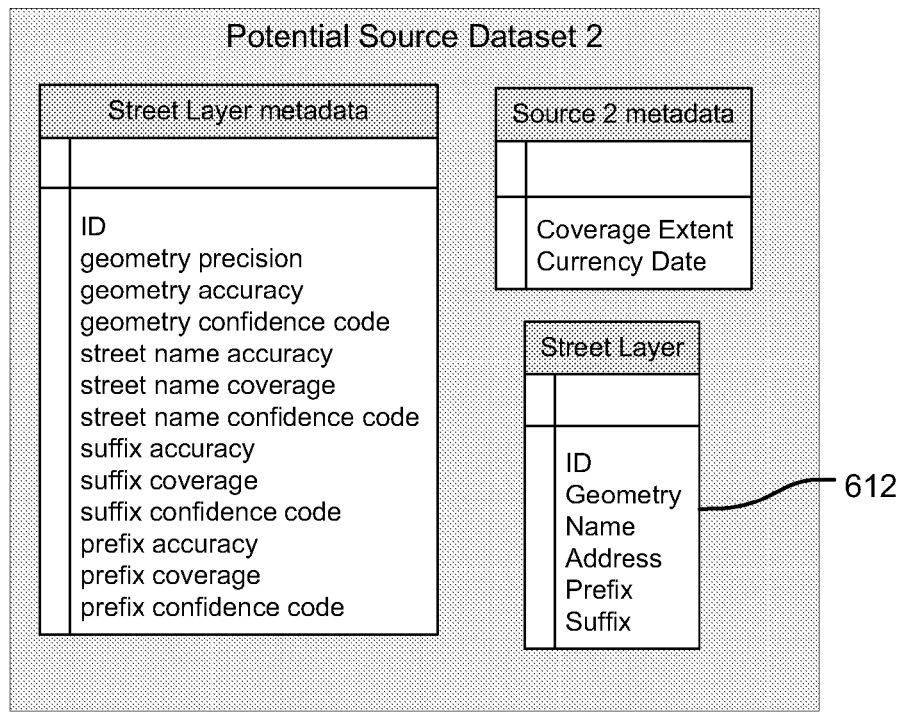
FIG. 13 is a schematic diagram of a data structure of a first candidate geospatial dataset.

Using the above-described metrics and techniques, potential resource data can be rated for quality. In some circumstances, a candidate resource may not have the same geographic extent and/or the same geometry and/or the same attribution as other sources or resources. Nevertheless, the techniques mentioned above can advantageously be used. For example, referring to FIGS. 12 and 13, a first candidate source dataset of FIG. 12 comprises a street layer table 610 comprising (other than the linking ID) only geometry data and so can only be used in relation to updating geometry data in a master geospatial dataset. In contrast, a second candidate source dataset of FIG. 13 comprises another street layer table 612 comprising geometry data, name data, address data, prefix data and suffix data. However, the another street layer table lacks address range data and so cannot be used to update address range attribution of the master geospatial dataset.

To summarise the embodiments described above, in order to maintain an up-to-date geospatial database, it is desirable to use the most accurate and recent information available. The examples described above enable an assessment to be made in respect of a given resource in order to determine if the given resource possesses geospatial data that is superior to the geospatial data currently being employed in a master digital map database in respect of geometry and/or attribution.

By way of further example, for a specific attribute or geometry at a given location on the Earth for a given type of geospatial layer, the geospatial object property assessment engine determines a source ID of the attribute or geometry. The source dataset is then searched for the source ID and determines a confidence code associated with the source ID.

The geospatial object assessment engine then identifies candidate datasets that include the attribution or geometry in question and cover the geographic area of interest. Confidence codes are then calculated (if not already calculated and respectively stored with the candidate datasets) and compared with the confidence code associated with the source ID in order to determine if one or more of the differences in confidence codes constitutes better geometry or attribution stored by one or more of the candidate datasets. Thereafter, the candidate resource associated with the optimum confidence code value is selected, if one exists, to use to update the attribute or geometry of the master digital map database in question.

In another example, if a confidence code scale is known, the geospatial object property assessment engine can identify or "hunt" attribution and/or geometry having associated confidence codes associated therewith that are, for example, equal to or less than a predetermined threshold value, for example expressed as a percentage, such as 60%. The identified attribution or geometry can be used as a basis for identifying better quality data amongst existing candidate resources, as described above, and/or identifying where new candidate resources are required, i.e. identifying where further data acquisition is required.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A geospatial object property assessment apparatus, the apparatus comprising:
  a geospatial object property processor, the geospatial object property processor including:
  a subject data source input capable of receiving a first metadata associated with quality of current source information content used to define a property of a geospatial object;
  a resource data source input capable of receiving a second metadata associated with quality of candidate resource information content for updating the definition of the property of the geospatial object;
  an assessment processor operably coupled to the subject data source input and the resource data source input, the assessment processor being arranged to use the first metadata and the second metadata in accordance with a predetermined ruleset in order to determine whether the candidate resource information content constitutes a qualitatively better resource to define the property of the geospatial object than the current source information content,
  wherein the assessment processor is arranged to calculate a first score using the first metadata and calculate a second score using the second metadata, and
  wherein the assessment processor is further arranged use the first score and the second score in accordance with the predetermined ruleset in order to determine whether the candidate resource information content constitutes the qualitatively better resource to define the property of the geospatial object than the current source information content; and
  an alert generator, the alert generator being arranged to generate a first alert in response to the determination by the assessment processor that the candidate resource information constitutes the qualitatively better resource to use to define the property of the geospatial object than the current source information content.

2. An apparatus as claimed in claim 1, wherein the first metadata comprises an indicator of quality of the current source information content associated with the property of a geospatial object and a first resource identifier for identifying a source dataset comprising the current source information content currently employed; and the second metadata comprises an indicator of quality of the candidate resource information content associated with the property of the geospatial object and a second resource identifier for identifying a resource dataset comprising the candidate resource information content to be assessed.

3. An apparatus as claimed in claim 1, wherein the property of the geospatial object is a geometry of the geospatial object.

4. An apparatus as claimed in claim 1, wherein the geospatial object property processor further comprises:

a data retrieval controller operably coupled to the subject data source input and the resource data source input, the data retrieval controller being arranged to request retrieval via the subject data source input of the first metadata and retrieval via the resource data source input of the second metadata;

wherein the data retrieval controller is arranged to request the retrieval in response to identification of the property of the geospatial object by received property identifying data.

5. An apparatus as claimed in claim 4, wherein the geospatial object property processor further comprises:

a property identity input arranged to receive the property identifying data to identify the property of the geospatial object to be assessed.

6. An apparatus as claimed in claim 1, wherein the first score and second scores are assessed using a tolerance factor applied in accordance with the predetermined ruleset.

7. An apparatus as claimed in claim 1, wherein the assessment processor is arranged to include use of a first degradation factor to calculate the first score.

8. An apparatus as claimed in claim 1, wherein the rule set comprises the following equation for performance of an evaluation:

$$s=((vc+vd)*m)-fd$$

where:
s is the score;
Vc is a confidence value;
Vd is a deviation value; and
fd is a degradation factor; and
m is multiplier in months used to support degradation by a percentage point for m months.

9. An apparatus as claimed in claim 1, wherein the assessment processor is capable of receiving a further metadata associated with another candidate resource information content, the assessment processor being arranged to employ a different criterion to assess the further metadata than a criterion employed by the predetermined ruleset to assess the second metadata.

10. An apparatus as claimed in claim 4, wherein the data retrieval controller is arranged to identify third metadata associated with quality of another current source information content used to define another property of the geospatial object in response to the determination that the qualitatively better resource is available to define the property of the geospatial object than the current source information content.

11. An apparatus as claimed in claim 10, wherein another candidate resource information content has a fourth metadata associated with quality of another candidate resource information content for updating the definition of the another property of the geospatial object, the assessment processor being arranged to use the third metadata and the fourth metadata in order to determine whether the another candidate resource information content constitutes a qualitatively better resource to define the another property of the geospatial object than the another current source information content.

12. An apparatus as claimed in claim 1, further comprising: a data editor arranged to update the property of the geospatial object by replacing the current source information content used to define the property of the geospatial object with the candidate resource information content.

13. An apparatus as claimed in claim 1, wherein the current source information content associated with the geospatial object is updated in response to evaluation of an expression using the first and second scores in accordance with the predetermined ruleset.

14. An apparatus as claimed in claim 1, wherein the geospatial object property processor is arranged to update the current source information content in response to a plurality of determinations by the assessment processor that a resource dataset comprising the candidate resource information constitutes a qualitatively better dataset resource to define respectively a plurality of geospatial object properties than a source dataset comprising the current source information content.

15. An apparatus as claimed in claim 1, further comprising:
a third metadata associated with quality of another candidate resource information content for updating the definition of the property of the geospatial object;
wherein the assessment processor is arranged to use the first metadata and the third metadata in accordance with the predetermined ruleset in order to determine whether the another candidate resource information content constitutes a qualitatively better resource to define the property of the geospatial object than the current source information content, the assessment processor being arranged to select one of the candidate information content and the another candidate information content in response to respective evaluations of the predetermined ruleset, the selected one of the candidate information content and the another candidate information content having a superior evaluation result and being used to update the current source information content.

16. A geospatial object property assessment system comprising:
a geospatial object property processor, the geospatial object property processor including:
a subject data source input capable of receiving a first metadata associated with quality of current source information content used to define a property of a geospatial object;
a resource data source input capable of receiving a second metadata associated with quality of candidate resource information content for updating the definition of the property of the geospatial object;
an assessment processor operably coupled to the subject data source input and the resource data source input, the assessment processor being arranged to use the first metadata and the second metadata in accordance with a predetermined ruleset in order to determine whether the candidate resource information content constitutes a qualitatively better resource to define the property of the geospatial object than the current source information content;
wherein the assessment processor is arranged to calculate a first score using the first metadata and calculate a second score using the second metadata, and
wherein the assessment processor is further arranged use the first score and the second score in accordance with the predetermined ruleset in order to determine whether the candidate resource information content constitutes the qualitatively better resource to define the property of the geospatial object than the current source information content; and an alert generator, the alert generator being arranged to generate a first alert in response to the determination by the assessment processor that the candidate resource information constitutes the qualitatively better resource to use to define the property of the geospatial object than the current source information content;

a database of currently used geospatial data to be analysed, the database of geospatial data comprising the current source information content associated with the definition of the property of the geospatial object; and a database of candidate geospatial data comprising the candidate resource information content associated with the geospatial object;

wherein the first metadata is associated with the database of currently used geospatial data and the second metadata is associated with the database of candidate geospatial data.

17. A computer-implemented method of assessing a property of a geospatial object, the method comprising:

receiving a first metadata associated with quality of current source information content used to define a property of a geospatial object;

receiving a second metadata associated with quality of candidate resource information content for updating the definition of the property of the geospatial object;

assessing, by a processor, the first metadata and the second metadata in accordance with a predetermined ruleset in order to determine whether the candidate resource information content constitutes a qualitatively better resource to define the property of the geospatial object than the current source information content, wherein the assessment to calculates a first score using the first metadata and calculate a second score using the second metadata, and wherein the assessment uses the first score and the second score in accordance with the predetermined ruleset in order to determine whether the candidate resource information content constitutes the qualitatively better resource to define the property of the geospatial object than the current source information content; and generating, by a processor, a first alert in response to the determination by the assessment processor that the candidate resource information constitutes the qualitatively better resource to use to define the property of the geospatial object than the current source information content.

18. A non-transitory computer-readable medium which stores a set of instructions which when executed performs a method of assessing a property of a geospatial object, the method executed by the set of instructions comprising:

receiving a first metadata associated with quality of current source information content used to define a property of a geospatial object;

receiving a second metadata associated with quality of candidate resource information content for updating the definition of the property of the geospatial object;

assessing the first metadata and the second metadata in accordance with a predetermined ruleset in order to determine whether the candidate resource information content constitutes a qualitatively better resource to define the property of the geospatial object than the current source information content, wherein the assessment to calculates a first score using the first metadata and calculate a second score using the second metadata, and wherein the assessment uses the first score and the second score in accordance with the predetermined ruleset in order to determine whether the candidate resource information content constitutes the qualitatively better resource to define the property of the geospatial object than the current source information content; and generating a first alert in response to the determination by the assessment processor that the candidate resource information constitutes the qualitatively better resource to use to define the property of the geospatial object than the current source information content.

19. The apparatus as claimed in claim 1, wherein the alert generator is arranged to generate a second alert in response to the determination by the assessment processor that the candidate resource information does not constitute a qualitatively better resource to use to define the property of the geospatial object than the current source information content.

20. The apparatus as claimed in claim 1, wherein the first alert identifies candidate information content for review.

21. The apparatus as claimed in claim 20 further comprising requesting further instructions as to whether to replace the current source information with the candidate resource information.

* * * * *